Aug. 16, 1927.

M. J. WEBER 1,639,121

INFANT SCALE

Filed June 16, 1924

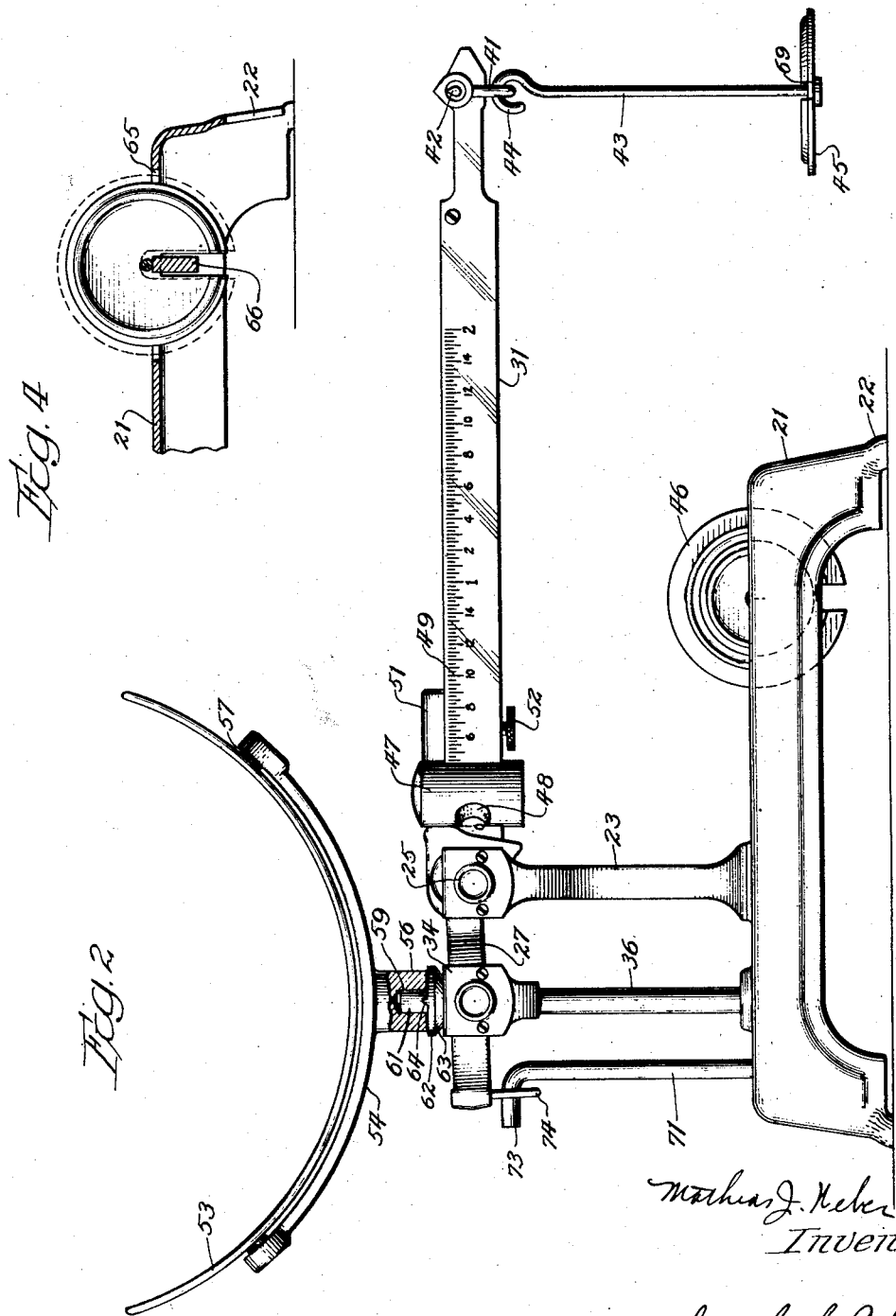

Aug. 16, 1927. 1,639,121
M. J. WEBER
INFANT SCALE
Filed June 16, 1924 3 Sheets-Sheet 3
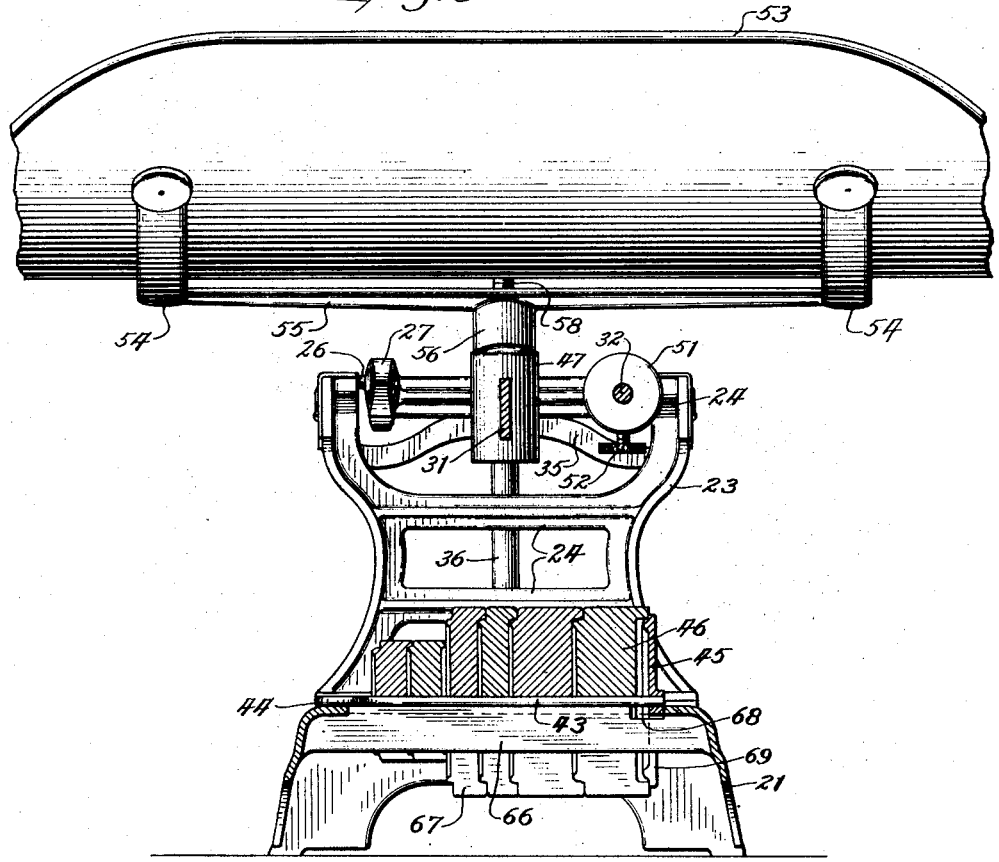
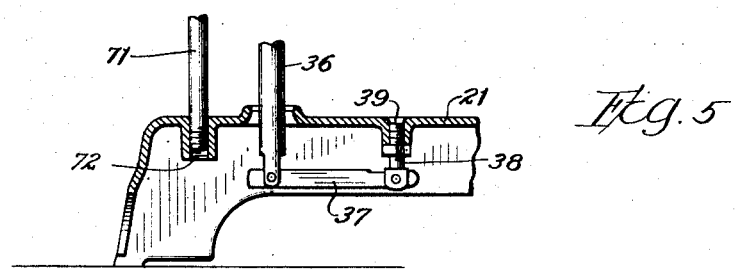
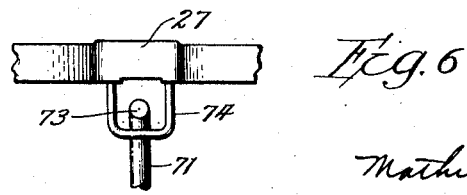

Patented Aug. 16, 1927.

1,639,121

UNITED STATES PATENT OFFICE.

MATHIAS J. WEBER, OF CHICAGO, ILLINOIS, ASSIGNOR TO CONTINENTAL SCALE WORKS, OF CHICAGO, ILLINOIS, A CORPORATION OF ILLINOIS.

INFANT SCALE.

Application filed June 16, 1924. Serial No. 720,229.

My present invention relates to weighing scales particularly adapted for taking the weight of infants, though it will be readily understood that any use of which the scales is capable is contemplated as coming within the scope of the invention.

An important object of the invention is the provision of means, in scales of the general type illustrated and to be hereinafter described, for supporting the weights and suspension member of the scales in compact and convenient arrangement when not in use, certain valuable features of novelty residing in the construction whereby this object is attained.

Another feature of the invention is the production, in scales of this character, of means for holding the scale pan in desired relation to the mechanism, and this without interfering with the easy removal of said pan and without requiring any removable holding devices, or intricate parts.

Another object of my invention resides in providing a scale for weighing babies, wherein the scale pan is arcuately shaped and relatively long compared to its width and is mounted on knife edges which lie longitudinally of the scale pan and directly beneath its center, so that the weight of the infant being weighed is carried directly over the knife edge.

Another important feature of my invention resides in swiveling the scale pan on its mounting, so that the relatively long scale pan may be turned transversely; that is, into a position parallel with the scale beam for storage purposes, and in addition this swiveling connection is provided with a locking device, preferably in the form of a cross rib, adapted to hold the scale pan when in weighing position, so that its length is parallel to its supporting knife edge.

Another point of novelty in the construction is the use of a stop member of convenient form and arrangement, adapted to limit the movement of the scale beam and to support the object being weighed when the weight thereof exceeds the capacity of the scales.

Numerous other objects and advantages of the invention will be apparent as it is better understood from the following description, which, taken in connection with the accompanying drawings, discloses a preferred embodiment thereof.

Referring to the drawings,

Fig. 2 is a front elevation of the scales, a part of the support for the scale pan being shown in section to illustrate the means for holding the same in place;

Fig. 3 is a side view, partially in section, illustrating the means for supporting the weights and suspension member when not in use;

Fig. 4 is a detail sectional view of said last-mentioned means;

Fig. 5 is a detail sectional view, taken through the base member of the scales and showing the manner in which the movable supporting rod and the stop member are mounted; and Fig. 6 is a detail elevational view of the upper part of said stop member and the staple with which it cooperates.

Figure 1:
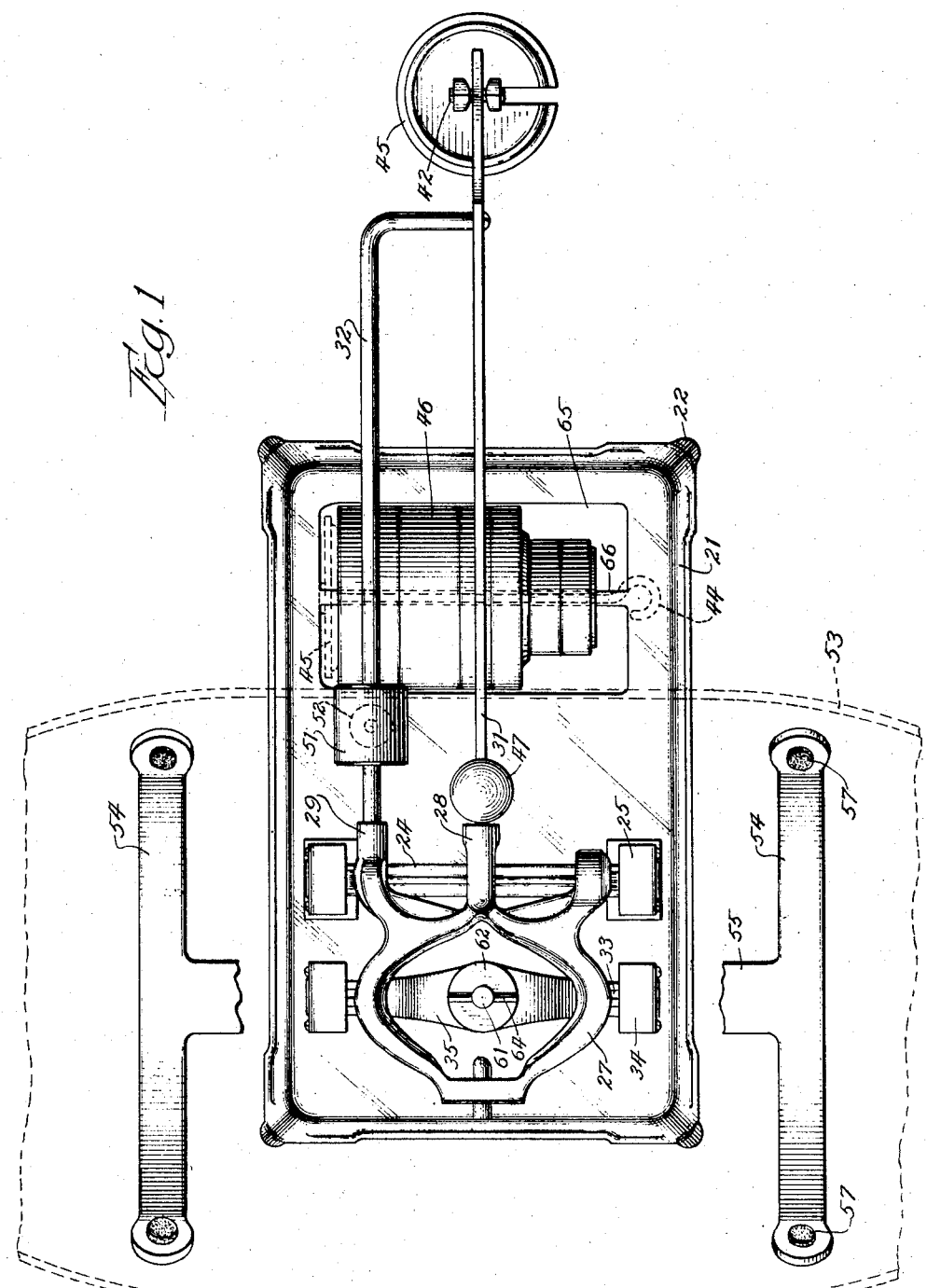
Figure 1 is a top plan view of a scales in which my invention is embodied, the scale pan being shown in dotted lines and the support therefor being partially broken away for convenience in illustration.

Upon said drawings, I have shown an illustrative embodiment of the invention which I will now proceed to describe in detail. A base member 21, which may be cast in suitable metal, serves to support the structure and is provided with legs 22 adapted to rest upon the floor, or any suitable support. Extending upwardly from said base member is a yoke 23, having cross ribs 24 and bearings 25 in the upper arms thereof adapted to support pivot pins 26 extending laterally from a casting 27, which is provided with socket portions 28 and 29, adapted respectively to receive a scale beam 31 and a counter-rod 32. Said casting 27 has pins preferably knife edges 33 extending from the sides thereof rearwardly of the bearings 25, which pins are disposed in bearing blocks 34 formed in the upwardly turned ends of a cross piece 35, rigidly secured to a movable vertical rod 36 which is connected to the under side of the base 21 by means of a link 37 and a threaded stud 38, taking into a tap hole 39 (see Fig. 5).

The outer end of the scale beam 31 is provided with a supporting loop 41, which is mounted upon a knife edge 42 extending through said beam. A suspension member 43, having a hook 44 at its upper end, is adapted to be suspended from said loop 41 and is provided with a bottom disk 45 upon which the weights 46 are adapted to be supported. A sliding weight 47, of usual character, is positioned upon said beam 31 and is provided with a cut-out 48 to facilitate the reading of the graduations 49 on the side of said beam. A counter-weight 51 is carried upon the counter-rod 32 and is adapted to be held in adjusted position by means of a set screw 52.

A scale pan 53 is supported upon a frame consisting of upwardly bowed arms 54 and a transverse connecting part 55, having a downwardly extending boss 56 at the center thereof. The arms 54 have contact points 57 at the end thereof, which may be of rubber, felt, or other suitable material, and the pan 53 may be held in place by means of a screw 58 extending through the center thereof and into the frame cross piece 55 and boss 56.

The boss 56 is provided with a center hole, or socket 59 adapted to receive a stud 61 extending upwardly from a supporting disk 62 formed at the upper end of a central boss 63 on the cross piece 35. In order to hold the scale pan in desired relation to the beam, namely transversely thereof, I provide a transverse knife edge rib 64 on the top of the disk 62, extending at opposite sides of the stud 61 and adapted to extend into a notch formed across the bottom of the boss 56. This is a distinct advantage, due to the difficulties which have been heretofore experienced with devices of this character, in which the scale pan is permitted to turn upon the stud, or post upon which it is held, or is likely to be inaccurately positioned in such manner as to adversely affect the balance of the scales. It will be noted that the scale pan 53 is relatively long as compared to its width and that it is supported by means of the boss 56 at a point directly beneath the center of its load, so that the entire weight on the scale pan will be directed downward immediately over the knife edges 33. One of the advantageous features of the swivel mounting 59 and 61 of this particular type of relatively long scale pan resides in the fact that when it is desired to store the scale, the pan 53 may be turned at right angles, so that the length of the pan is parallel to the scale beam 31. This is done by merely lifting the boss 56 upwardly from knife edge 64, which permits the turning for storage.

I provide an opening 65 in the top of the base member 21, with a cross rib 66 disposed at the center of said opening. Said rib 66 is adapted to support the weights 46, which are provided with radial slots 67 adapted to fit over said rib, the weights being arrangeable in compact relationship, as shown in Fig. 3 Said rib 66 is notched at one end, as indicated at 68, to receive the disk 45 of the suspension member 43, said disk having a radial slot 69 similar to the slots 67 in the weights 46. The rod of said suspension member extends across the top of the rib 46 and it will be seen that the entire set of weights and the suspension member are thus housed within the transverse dimension of the base plate 21. In this manner, said parts may be conveniently stored and handled and provision is made for relieving the scale beam of the weight of the suspension member, as well as the various weights 46, since a convenient place is provided for them and they need not be left suspended except when actually in use.

At the left of the scales, as shown in Fig. 2, I provide a post 71, which is threaded into a tap hole 72 in the base plate 21 and is turned to horizontal position at the top, as indicated at 73. A staple 74, depending from the rear of the casting 27, engages over the horizontal portion 73 of said post 71 and said post thus serves to limit the downward movement of the scale beam, as well as to support the casting 27 and the weight imposed thereon when the weight in the scale pan exceeds the capacity of the scales or overbalances the weights applied.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. Weighing scales, comprising a base, a scale beam supported from said base, a support for the object to be weighed, a suspension member carried by said beam, and a plurality of balancing weights adapted to be supported by said suspension member, said base being formed for housing said weights and suspension member when not in use.

2. Weighing scales, comprising a base, a scale beam supported from said base, a support for the object to be weighed, a suspension member carried by said beam, and a plurality of balancing weights adapted to be supported by said suspension member, said base being formed for housing said weights and suspension member when not in use, said means comprising a transverse rib disposed in an opening in said base.

3. Weighing scales, comprising a base, a scale beam supported from said base, a support for the object to be weighed, a suspension member carried by said beam, and a plurality of balancing weights adapted to be supported by said suspension member, said base being provided with means for housing said weights and suspension member when not in use, said means comprising a transverse rib disposed in an opening in said base, and said weights and suspension member being radially slotted to fit upon said rib.

4. Weighing scales, comprising a base having an opening therein and a transverse balance weight support disposed centrally in said opening for supporting balance weights not in use, and weighing mechanism supported by said base.

5. Weighing scales, comprising a base having an opening therein and a transverse balance weight support disposed centrally in said opening weighing mechanism including, a scale beam supported from said base, and a balance weight suspension member removably carried by said beam, said balance weight suspension member being arrangeable with the weights upon said balance weight support when not in use.

6. Weighing scales, comprising a base having an opening therein and a transverse weight support disposed centrally in said opening, a scale beam supported from said base, and a suspension member removably carried by said beam, said suspension member being arrangeable with the weights upon said weight support when not in use and comprising a rod portion and a supporting disk, the latter being radially slotted and said transverse support having a recess at one end thereof to receive the hub portion of said disk.

7. Weighing scales, comprising a base, a scale beam, a bracket attached to an end of said beam, a supporting frame detachably mounted on said supporting bracket having a transverse groove therein and adapted to receive a weight receiving member, and means for preventing rotary movement of said supporting frame, said means comprising an upstanding rib on said bracket adapted to cooperate with the transverse groove in said supporting frame.

8. Weighing scales, comprising a base, a scale beam, a supporting frame at an end of said beam, a weight receiving member supported by said frame having a transverse groove therein, and means for preventing rotary movement of said member after the same is positioned, said means comprising an upstanding rib on said frame for cooperating with the transverse groove in said weight receiving member.

9. Weighing scales, comprising a base, a scale beam, a supporting frame at an end of said beam, a weight receiving member removably supported by said frame, and means operable upon assembly for insuring the positioning of said member in transverse relation with respect to said frame.

10. Weighing scales, comprising a base, a scale beam supported from said base, a scale pan supported from one end of said beam, a radially slotted suspension member removably carried at the opposite end of the beam, and means for supporting said slotted suspension member and the weights of the scale when not in use, said suspension member having a supporting rod or stem portion and means comprising a bar adapted to fit within the slot of said suspension member with the stem of the latter disposed over the top of the bar, the weights being then arrangeable upon said stem and bar.

11. In a scale for weighing babies, the combination of a platform, a scale beam pivotally mounted thereon, said scale beam having a frame portion, a cross piece mounted on said scale beam and having a knife edge connection with said frame, said cross piece having an upstanding support in line with a line passing through the knife edges, a relatively long scale pan arcuate in cross-section and means for mounting said pan on said upstanding support, whereby the entire weight of the pan is directed downwardly in line with said knife edges.

12. In a scale for weighing babies, the combination of a scale base, a scale beam pivotally mounted thereon, comprising a rearwardly extending frame portion, a cross piece mounted on said scale beam and pivotally connected to said frame by spaced pivots, said cross piece including an upstanding portion adapted to support a scale pan, a relatively long arcuately shaped scale pan and means for supporting said scale pan on said cross piece and for maintaining said scale pan in position, so that the entire weight of said scale pan is directed downwardly in a line passing through the pivotal point.

13. In a scale for weighing babies, the combination of a base, a scale beam pivoted thereon, said scale beam having a rearwardly extending frame portion, a cross piece supported on said beam and having spaced pivotal connections with said frame, a relatively long arcuate scale pan swivelly mounted on said cross piece to permit said scale pan to be turned transversely thereof and means for maintaining said scale pan in transverse position relative to said scale beam.

MATHIAS J. WEBER.